United States Patent [19]
Suzuki et al.

[11] 3,856,397
[45] Dec. 24, 1974

[54] VIEWING AND ELECTROSTATIC COPYING MACHINE

[75] Inventors: Hidenori Suzuki, Kawasaki; Katsumi Maeda; Keiji Nakatani, both of Tokyo; Kenjiro Ishii, Yokohama, all of Japan

[73] Assignee: Minolta Camera Kabushiki Kaisha, Osaka, Japan

[22] Filed: July 12, 1973

[21] Appl. No.: 378,746

[30] Foreign Application Priority Data
July 19, 1972  Japan.......................... 47-85538[U]

[52] U.S. Cl. ................................................ 355/45
[51] Int. Cl. ............................................ G03b 13/28
[58] Field of Search ..................................... 355/45

[56] References Cited
UNITED STATES PATENTS

| | | | |
|---|---|---|---|
| 2,769,369 | 11/1956 | Oiler.................................... | 355/45 |
| 3,002,434 | 10/1961 | Reuter................................. | 355/45 |
| 3,730,622 | 5/1973 | Freeman.............................. | 355/45 |

FOREIGN PATENTS OR APPLICATIONS

| | | | |
|---|---|---|---|
| 368,703 | 5/1963 | Switzerland........................... | 355/45 |

*Primary Examiner*—John M. Horan
*Attorney, Agent, or Firm*—Wolder & Gross

[57] ABSTRACT

A microfilm viewer and electrostatic copying machine includes a mirror which is swingable between a first position which directs an image onto a viewing screen and a second position which permits the projection of the image on a reproduction focal plane. Feed rolls withdraw copy paper from a roll thereof and advance it through a cutter to an electrostatic charger and then to a conveyor which transports the charged paper to the image focal plane and then to the image developer. A motor driven endless sprocket chain has a pair of spaced first sprocket sections along one side, a second sprocket chain section along the opposite side, and a switch actuator. The chain motor is connected to a source of current through a normally closed first switch and upon energization of the motor the sprocket chain is driven to advance the actuator from the first switch to close it, motivate the feed rolls by the second chain section, drive the mirror by the leading first chain to its second position, drive the feed rolls by the second chain section, actuate a second switch to operate the cutter so that a copy sheet is advanced through the charger to the focal plane, actuate a third switch to initiate a timer which energizes the lamp and stops the copy sheet advance at the focal plane for an exposure interval, returns the mirror to its first position by the trailing first chain section and actuates the first switch to open it and stop the chain to complete the cycle.

6 Claims, 4 Drawing Figures

VIEWING AND ELECTROSTATIC COPYING MACHINE

BACKGROUND OF THE INVENTION

The present invention relates generally to improvements in viewing and copying machines and it relates particularly to an improved machine for viewing microfilm and for electrostatically or xerographically producing an enlarged copy of the viewed microfilm.

In the production of enlarged copies of portions of microfilm, it is highly desirable to preview the microfilm before its reproduction and combination viewing and copying machines have been proposed and available for accomplishing these functions. However, machines of this type have heretofore possessed numerous drawbacks and disadvantages. They are highly complex machines, both electrically and mechanically, and hence expensive, commonly unreliable and requiring frequent maintenance and servicing of a costly nature. Furthermore, the machines are bulky and awkward, of little versatility and they otherwise leave much to be desired.

SUMMARY OF THE INVENTION

It is a principal object of the present invention to provide an improved viewing and copying machine.

Another object of the present invention is to provide an improved machine for viewing microfilm and for producing enlarged copies of preselected portions of the microfilm.

Still another object of the present invention is to provide an improved xerographic enlarger and copying machine for use with microfilm and a microfilm previewer.

A further object of the present invention is to provide an improved machine of the above nature characterized by its simplicity, ruggedness, reliability, low cost and high versatility and adaptability.

The above and other objects of the present invention will become apparent from a reading of the following description taken in conjunction with the accompanying drawings which illustrate a preferred embodiment thereof.

In a sense, the present invention contemplates the provision of a viewing and electrostatic copying machine comprising a viewing section, an electrostatic copying section including an electrostatic charger, an electrostatic image developer, a conveyor for transporting a copy sheet from the charger to the developer along a focal plane, a mirror moveable between a retracted position for directing an image of an original to the viewing section and an advanced position for permitting the image to focus on the focal plane, a moveable common drive and timing member selectively actuated to advance a single cycle, feed rolls motivated by the drive member for delivering copy paper to the copying section, a mechanism motivated by the drive member for successively transferring the mirror from its retracted to its advanced position and later returning the mirror to its retracted position, and a timing network initiated by the actuation of a switch by an element carried by the drive member, the initiated timing network halting the conveyor to support a copy sheet at the focal plane and energizing an exposure lamp and after a predetermined interval extinguishing the lamp and resuming the advance of the conveyor to advance the exposed copy paper to the developer.

In the preferred form of the machine the drive member is an endless sprocket chain driven by a motor which is connected to a source of current through a normally closed switch which is opened by an actuator member on the sprocket chain at the end of a cycle. The mirror is swung to its advanced position by the 180° rotation of a sprocket wheel and is returned upon the further 180° timing thereof and the sprocket wheel lies in the path of a pair of longitudinally spaced sprocket chain sections carried on a side of the main sprocket chain, each section being of a length to rotate the mirror sprocket wheel 180°. The second sprocket chain section is carried on an opposite side of the main sprocket chain and a sprocket wheel which drives the paper feed rolls lies in the path of the second sprocket chain section. A paper cutter lying in advance of the paper delivery rollers is actuated upon the timed closing of a switch actuated by the chain carried actuator and the timer is initiated by the actuation of a switch actuated by the chain carried actuator.

The improved viewing and electrostatic copying device is timed, sequenced and primarily motivated by a single endless sprocket chain and is simple, rugged, reliable and of relatively low cost.

DESCRIPTION OF THE PREFERRED EMBODIMENT

Figure 1:
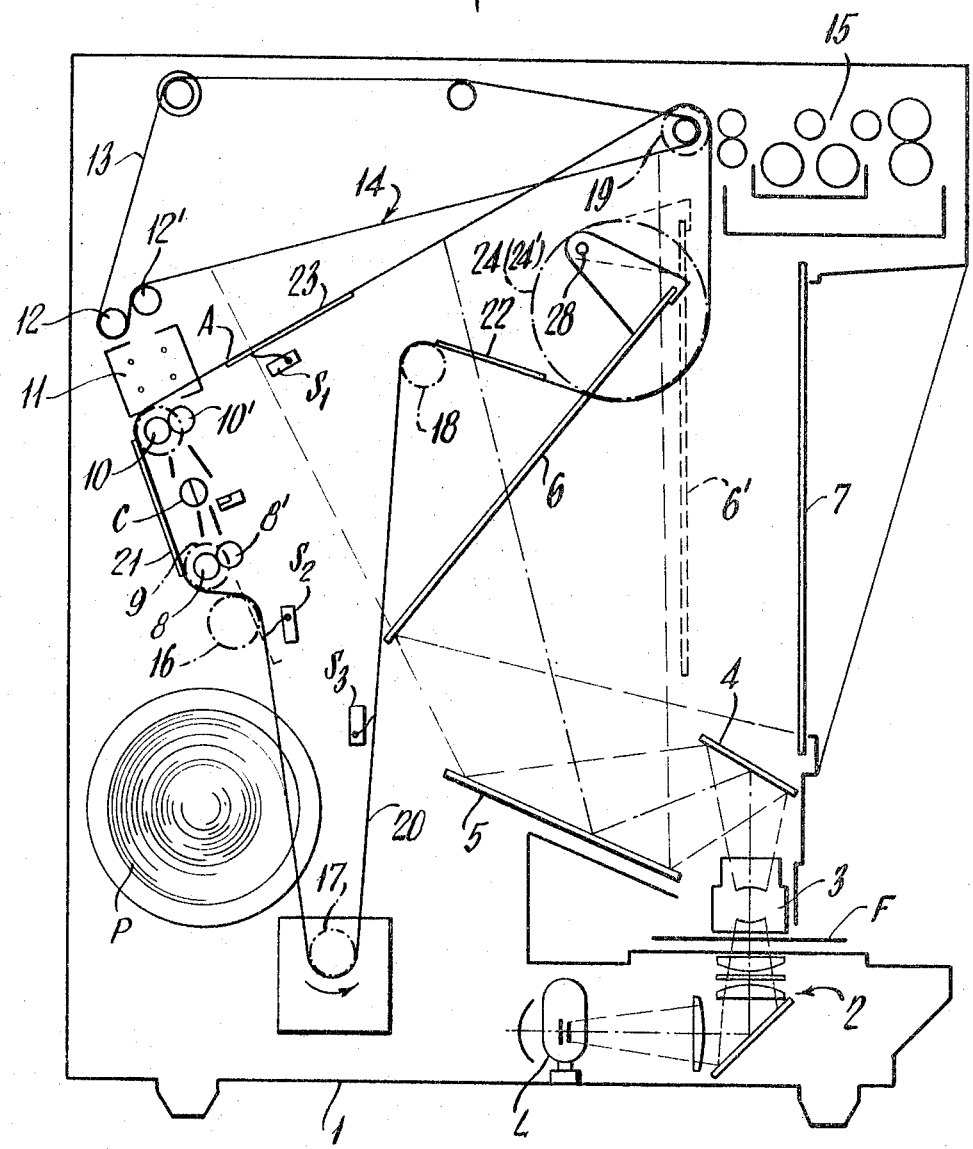
FIG. 1 is a vertical sectional view of a microfilm viewing and electrostatic copying machine embodying the present invention, illustrating the components of the machine.
Figure 2:
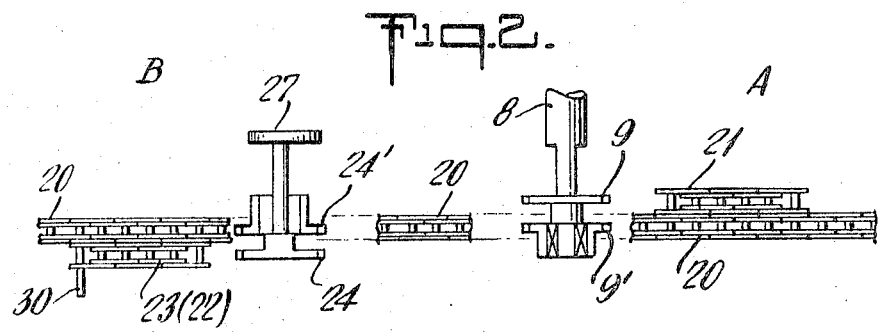
FIG. 2 is fragmentary enlarged detailed view of the drive mechanisms of components thereof.
Figure 3:
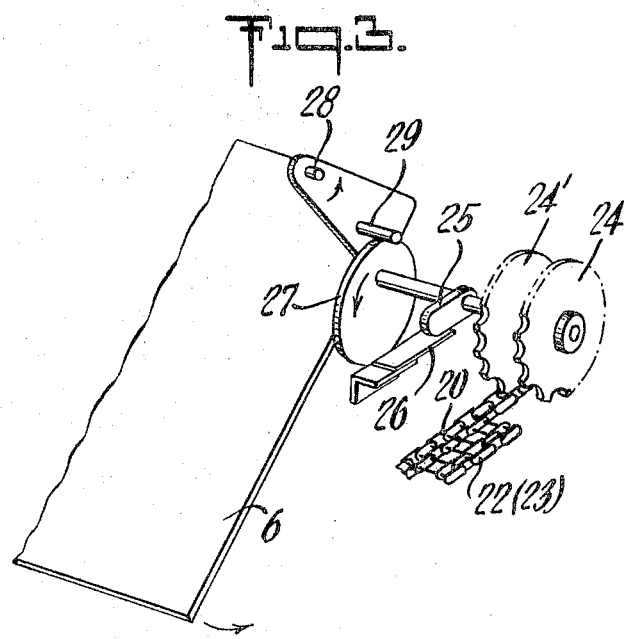
FIG. 3 is a fragmentary perspective view of the mirror transfer mechanism.

Referring now to the drawing which illustrates a preferred embodiment of the present invention, the reference numeral 1 generally designates a housing in which the various components of the machine are located and mounted, and which has a film receiving recess in its front face having a bottom window upon which a microfilm F to be viewed and copied is removably supported. Located above the film receiving recess is a second window having a vertical projection screen 7 registering therewith.

A projector lamp L and an associated concave reflector is positioned on the base of housing 1 and a reflector and condensor lens system 2 concentrates the light from lamp L onto the film supporting window. A vertical objective lens 3 supported above the film F focusses an image of the film F by way of inclined fixed first and second planar mirrors 4 and 5 onto a planar mirror 6. The mirror 6 is supported by brackets for swinging about the axis of supporting pivot pins 28 between an inclined retracted position, as shown by full line in FIG. 1, reflecting the light from mirror 5 to direct the focussed image onto screen 7, and an advanced position 6, as shown by broken line in FIG. 1, in which the mirror is out of the path of the image forming rays which focus on an upper focal plane as defined by exposure station 14.

A roll P of copy or sensitive paper is supported in the lower rear part of housing 1 and a pair of contacting horizontal feed rolls 8, 8' is positioned above the copy paper roll P, the roll 8 having affixed thereto a sprocket wheel 9 and rotatably supporting an adjacent idler sprocket wheel 9' of the same diameter as sprocket wheel 9. A second pair of feed rolls, 10, 10' similar to the first pair 9, 9' is located above and slightly rearwardly of the feed roll first pair and has associated with feed roll 10 a drive sprocket wheel. A paper cutting device C is located between the pairs of paper feed rolls as is a series of paper guides. Shortly above and in alignment with the upper pair of guide rolls 10, 10' is an electrostatic charger of known construction, for example, of the corona discharge type above which is disposed a pair of suitably spaced copy paper transfer rollers 12 and 12' which also function to uncurl copy paper withdrawn from roll P. An endless paper conveyor belt 13 extends about the transfer rolls 12 and 12' and a group of other guide rolls the heading of which has affixed thereto a sprocket wheel 19. The conveyor belt 13 traverses a lower advance run along the focal plane or exposure station 14. An electrostatic image developer device 15 of known construction is located in the upper front of housing 1 at the discharge end of the advance run of conveyor 13 and is provided with paper withdrawing and feed rolls, and is driven by a motor MP.

The mechanism for swinging the mirror 6 between its advanced and retracted positions includes a shaft to one end of which is affixed a sprocket wheel 24 and to the other end of which is affixed a cam defining eccentrically mounted disc 27. A follower defining pin 29 engages the cam 27 and is mounted on the mirror support bracket at a position offset from pivot pins 28. The follower 29 and cam 27 are so related that when the follower engages the opposite raised and depressed portions of cam 27, the mirror 6 is in its advanced and retracted positions respectively. In order to accurately position the mirror 6 in its advanced and retracted positions there is provided an indexing click assembly, including a click member 25 affixed to the cam shaft and having diametrically opposite flats and a suitably mounted leaf spring bearing on the click member 25, so as to alternatively urge the mirror 6 to its fully advanced or fully retracted positions. A freely rotatable idler sprocket wheel 24' similar to sprocket wheel 24 is supported by the cam shaft adjacent to sprocket wheel 24.

The sequencing, timing and motivating mechanism includes an endless main sprocket chain 20 which traverses a closed path extending about and engaging a sprocket wheel 17 driven by the main electric drive motor Mm, sprocket wheel 16 below delivery rolls 8, 8', sprocket wheel 9', the sprocket wheel on roller 10, sprocket wheel 19, sprocket wheel 24' and sprocket wheel 18. The chain 20 is driven by sprocket wheel 17 in a counterclockwise direction as viewed in FIG. 1. Affixed to one side of main sprocket chain 20 for movement into successive engagement with mirror control sprocket wheel 24, and a pair of longitudinally spaced sprocket chain sections 22 and 23 of the same construction as sprocket chain 20 and each being of a length half the periphery of sprocket wheel 24. The chain sections 22 and 23 are so positioned on chain 20 that upon initiating of the copying cycle chain section 22 engages sprocket wheel 24 and following the exposure interval chain section 23 engages the sprocket wheel 24.

A second sprocket chain section 21 of similar construction to main chain 20 is affixed to a side of main chain 20 opposite to that of chains 22 and 23, and is of a length to drive delivery rolls 8, 8' an amount to withdraw a desired predetermined length of paper from roll P. At the termination of the drive cycle of chain 20, chain section 21 approaches engagement with sprocket wheel 9 so that upon initiation of a cycle delivery rolls 8, 8' are promptly driven.

A switch actuator defining pin 30 is mounted on the leading end of chain section 23 in the direction of advance of chain 20 and projects inwardly therefrom. A double throw first switch $S_1$ has an actuator arm located in the path of pin 30 and includes a normally closed contact $b$ and a normally open contact $a$, the switch $S_1$ being in actuated engagement with pin 30 at the termination of the copying cycle. A second normally open switch $S_2$ with an actuating arm located in the path of pin 30 is positioned forward of switch $S_1$ along the path of chain 20 a distance somewhat greater than the length of chain section 21. A third switch $S_3$ which is normally open, has an actuating arm located in the path of pin 30 and is positioned along chain 20 in advance of switch $S_2$ an amount corresponding to that at which the cut copy sheet reaches the exposure station 14.

Figure 4:
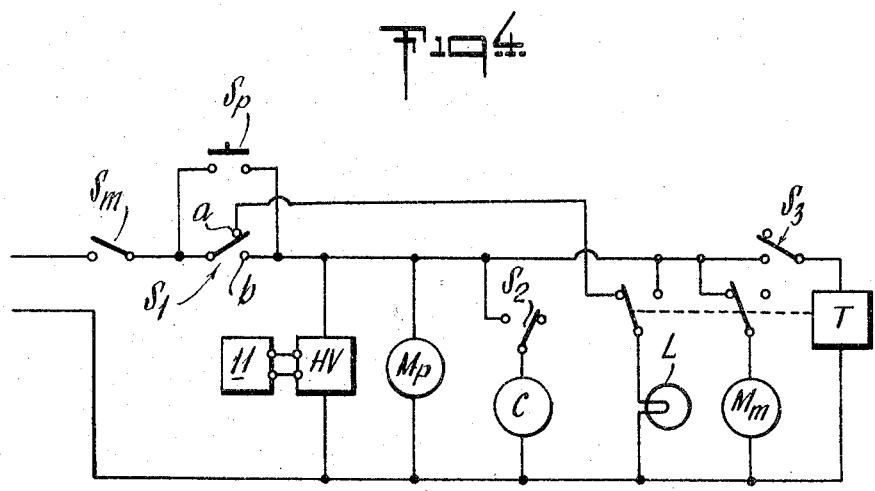
FIG. 4 is a circuit diagram of the machine control network.

The system control network is illustrated in FIG. 4 and includes a main power switch Sm connecting one terminal of a power source to the arm of switch $S_1$ and the other terminal of the power source being connected to the machine electric ground line. Terminal $b$ of switch $S_1$ is connected to the machine electric hot line and the arm and terminal $b$ of switch $S_1$ are shunted by a normally open manually operated push button switch $Sp$. Connected between the electric ground and hot lines are a high voltage generator which energizes the charger 11, the developer drive motor Mp, the series connected switch $S_2$ and electrically energized paper cutter C, and the series connected switch $S_3$ and timer T. The timer T actuates, upon energization thereof and for a predetermined interval, a double throw first switch whose arm is connected through lamp L to the ground line, whose normally closed terminal is connected to terminal $a$ of switch $S_1$ and whose normally open terminal is connected to the hot line, and a normally closed second switch which is connected in series with motor Mm between the hot and ground lines.

Considering now the operation of the improved viewing and copying machine, upon closure of switch Sm and the machine being in its viewing condition, as illustrated in the drawings, the lamp L is energized through the closed contact $a$ of switch $S_1$. A film F is positioned on the film window and is projected onto the screen 7 by way of objective lens 3, mirrors 4 and 5 and retracted mirror 6. The film F is shifted to view different sections thereof and when a copy of a viewed section is desired, the film is left stationary and switch Sp is momentarily closed to energize the hot line and motor Mm which advances sprocket chain 20 to move pin 30 out of engagement with switch $S_1$ and release it to contact $b$ whereby to maintain the hot line energized and maintain the continued energization of motor Mm and the energization of the charger high voltage supply and developer motor Mp, and the deenergization of lamp L.

As the chain 20 initially advances the chain section 21 engages the sprocket wheel 9 to rotate rolls 8 and 8' which withdraw a predetermined length of paper from roll P and advance it to the running feed rolls 10, 10'. Immediately upon the withdrawal of the length of copy paper as determined by the length of chain section 21, the pin 30 engages the actuating arm of switch $S_2$ to close switch $S_2$ which causes the energization of cutter C to sever a sheet of copy paper which is advanced through charger 11 to transfer rolls 12, 12' where the electrically charged copy paper sheet is carried by conveyor 13 to the focal plane of exposure station 14. Also, with the initial advance of sprocket chain 20, sprocket chain section 22 engages and rotates sprocket wheel 24 180° to transfer mirror 6 to its retracted position out of the path of the image rays directed to the exposure station 14.

When the charged severed sheet of copy paper reaches its precise position at exposure station 14, the pin 30 engages the actuating arm of switch $S_3$ to close switch $S_3$ which energizes and actuates the timer T, the initial actuation of which opens the switch and deenergizes motor M$m$ to stop the sprocket chain 20 whereby to stop the advance of conveyor 13 and maintain the charged copy paper sheet in exposure station 14, and it also transfers the switch in series with lamp L to connect lamp L to the hot line and energize lamp L. With the energization of lamp L an image of the selected section of microfilm F is projected onto the stationary charged copy sheet to produce a latent electrostatic image thereon. After a predetermined interval, upon sufficient exposure of the copy sheet, the timer T returns the switches in series with lamp L and motor M$m$ to their initial positions to deenergize the lamp L and energize the motor M$m$ which continues the advance of sprocket chain 20 and conveyor 13. The conveyor 13 advances the latent image carrying sheet to developer 15 where the image is developed and the copy sheet discharged. The advancing sprocket chain 20 at this time advances the sprocket chain section 23 along sprocket wheel 24 to return the mirror 6 to its retracted film viewing position and upon further advance of sprocket chain 20 the pin 30 engages the actuating arm of switch $S_1$ to transfer the switch from terminal $b$ to terminal $a$ to thereby deenergize motors M$m$ and M$p$ and the high voltage supply and energize lamp L thereby returning the machine to its dormant viewing condition and in readiness for another copying cycle in the above manner.

While there has been described, and illustrated a preferred embodiment of the present invention, it is apparent that numerous alterations, omissions and additions may be made without departing from the spirit thereof.

We claim:

1. A viewing and electrostatic copying machine comprising a viewing section, an electrostatic copying section including an electrostatic charging means, an electrostatic image developing means and means for advancing copy paper from said charging means along an image focal plane to said developing means, means including a mirror moveable between a retracted and an advanced position for alternatively projecting an image of an original to said viewing section or to said copying section focal plane, means for delivering copy paper to said copying section, a drive and timing sprocket chain traversing a predetermined run, selectively actuated drive means for cycling said sprocket chain, transfer means motivated by said sprocket chain for successively advancing and retracting said mirror at spaced intervals during a cycle of said sprocket chain and including a pair of longitudinally spaced first sprocket chain sections carried by and transversely offset from said endless sprocket chain, a sprocket wheel located in the path of and successively engageable and rotatable by said sprocket chain sections at spaced intervals and means for swinging said mirror between said advanced and retracted positions with the rotation of said sprocket wheel, means on said sprocket chain for motivating said copy paper delivery means, an actuating element carried by said sprocket chain and means including a first switch actuated by said actuating element at a predetermined position for exposing copy paper supported at said focal plane to an image of said original for a predetermined time in response to the actuation of said switch while said mirror is in said advanced condition.

2. The machine of claim 1 comprising a second switch actuated by said actuating element at a predetermined position and a paper cutter located in the path of said paper between said paper delivery means and said copying section and actuated in response to the actuation of said second switch.

3. The machine of claim 1 wherein said copy paper delivery means comprises a pair of parallel adjacent feed rolls, a sprocket wheel mounted on one of said feed rolls and a second sprocket chain section carried by said endless sprocket chain and differently transversely offset thereon relative to said first sprocket chain sections and moveable into drive engagement with said sprocket wheel to rotate said drive rolls a predetermined interval.

4. The machine of claim 1 wherein said exposing means comprises an original illuminating lamp, a conveying means for transporting a copy paper along said focal plane, a timer, means responsive to the initiation of said timer for energizing said lamp and stopping said conveying means, means responsive to said timer following a predetermined interval from the initiation thereof for deenergizing said lamp and actuating said conveying means, and means responsive to the actuation of said first switch for actuating said timer.

5. The machine of claim 1 wherein said transfer means and said paper delivery means comprise longitudinally spaced sprocket chain sections carried by said endless sprocket chain and said transfer means and said paper delivering means each comprises a sprocket wheel located in the path of a corresponding sprocket chain section.

6. The machine of claim 5 wherein said cycling means comprises a motor, a sprocket wheel driven by said motor and engaging said endless sprocket chain, and means including a normally closed switch connecting said motor to a source of current, said actuating element carried by said endless sprocket chain being moveable therewith to a position actuating said normally closed switch to an open condition.

* * * * *